Oct. 8, 1968

F. J. COSENZA 3,404,716

SELF-LOCKING FASTENER

Filed April 7, 1967

INVENTOR:
Frank J. Cosenza

ATTORNEYS

Oct. 8, 1968  F. J. COSENZA  3,404,716
SELF-LOCKING FASTENER
Filed April 7, 1967  3 Sheets-Sheet 2
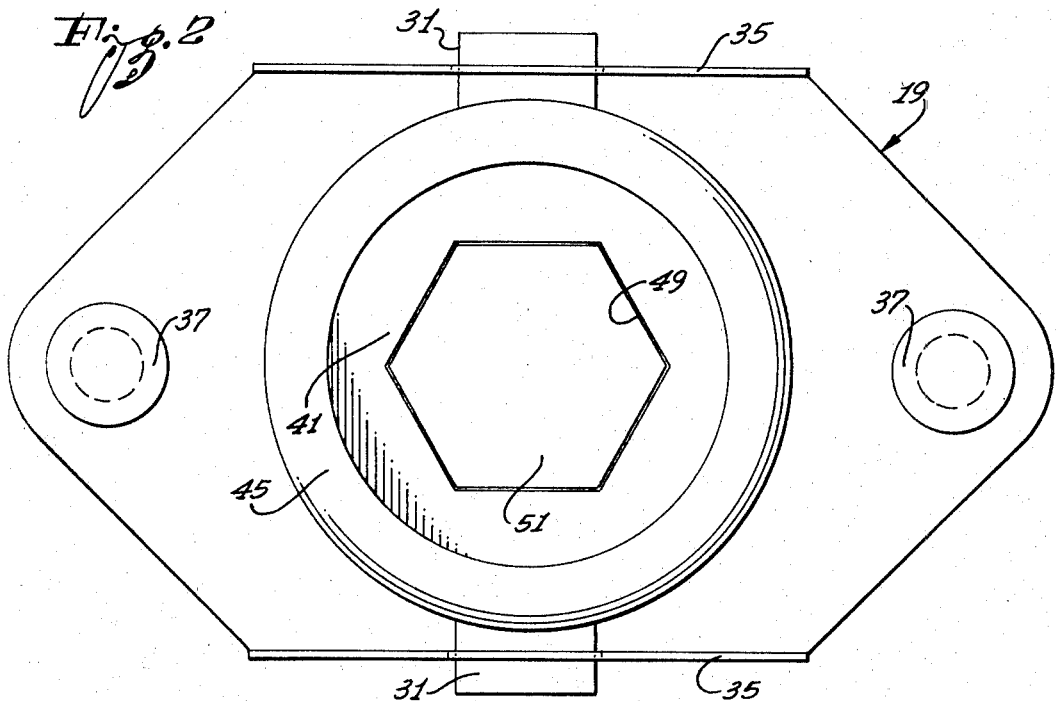
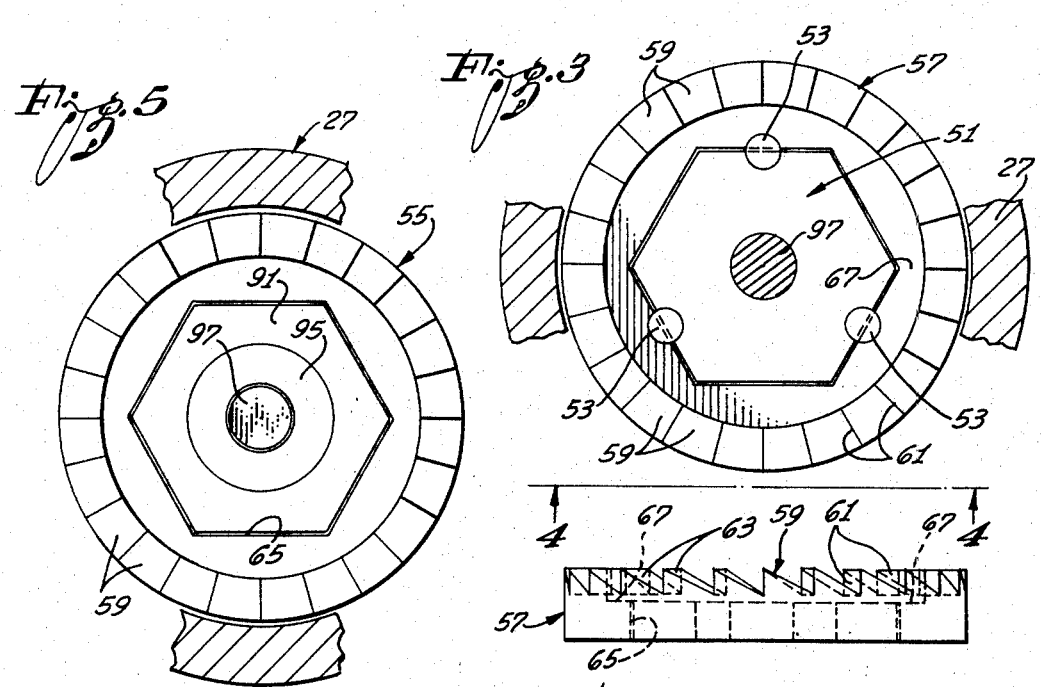
INVENTOR:
Frank J. Cosenza
ATTORNEYS

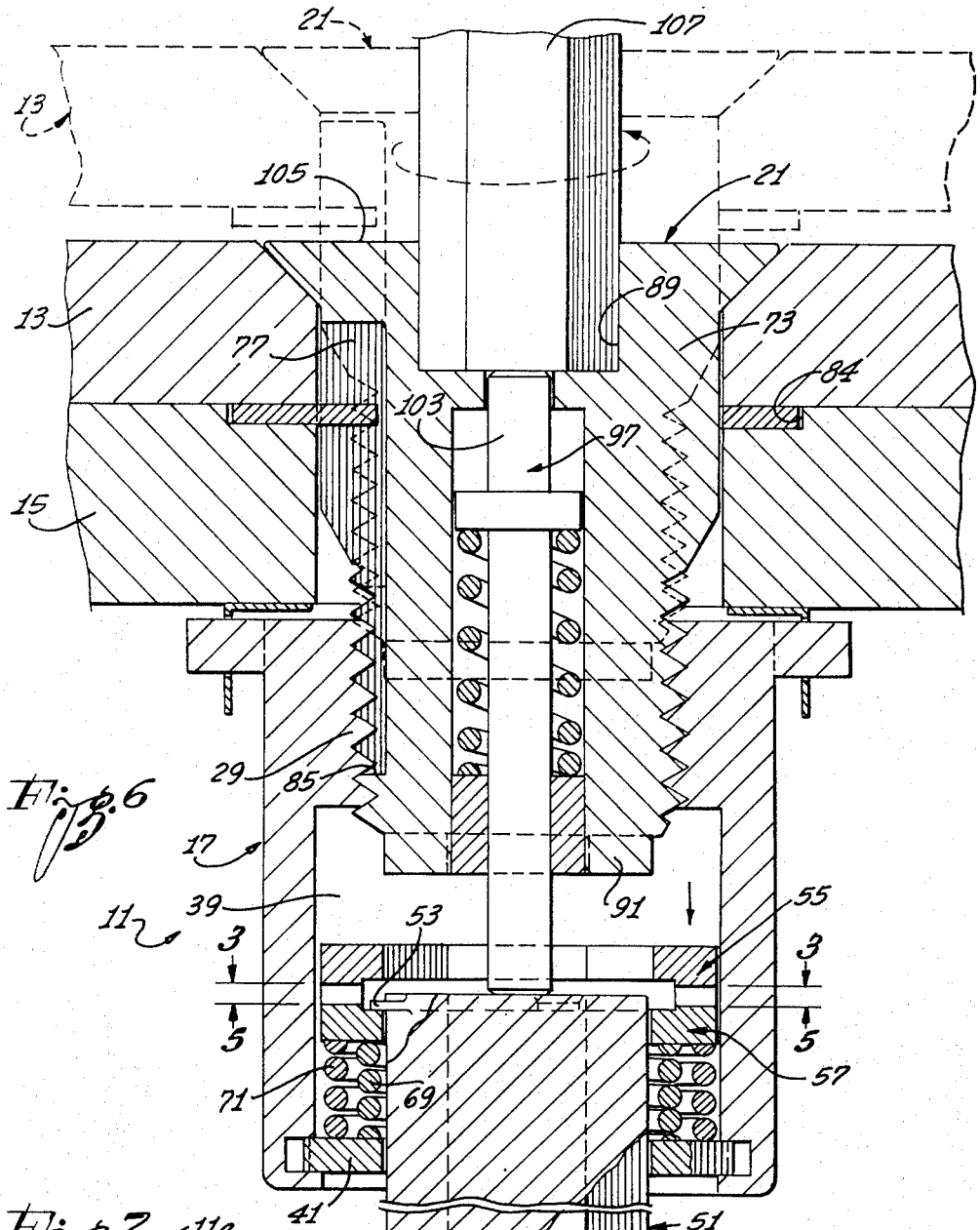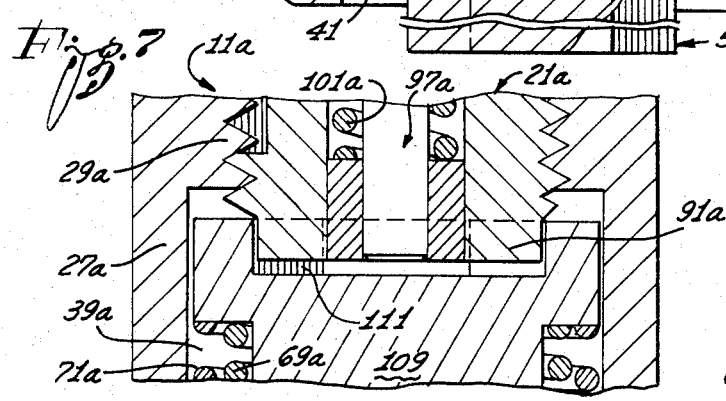

3,404,716
SELF-LOCKING FASTENER
Frank J. Cosenza, Palos Verdes Peninsula, Calif., assignor, by mesne assignments, to Tridair Industries, Redondo Beach, Calif.
Filed Apr. 7, 1967, Ser. No. 629,299
5 Claims. (Cl. 151—8)

ABSTRACT OF THE DISCLOSURE

A fastener which includes a stud having an externally threaded portion and a nut having an internally threaded portion. The stud and nut can be rotated relative to each other to threadedly interconnect the stud and nut. Releasable means are provided for preventing counterrotation of the stud relative to the nut when the stud and nut are interconnected. The releasable means are completely releasable at the will of the operator to allow coutnerrotation of the stud to allow unscrewing of the stud from the nut.

Background of the invention

Various machines such as aircraft, missiles, etc., which produce, or are subject to, vibration use removable panels sometimes called access panels. These panels are secured by fasteners to various members of the aircraft structure such as the frame and are removable to provide access to electronic, hydraulic, or other types of equipment. As these panels must be removed from time to time, the fasteners therefore must be fast acting. Typically threaded fasteners which include a stud and a nut are used.

A primary problem with threaded fasteners is that the vibration of the panels tends to loosen the nut from the stud. This problem is particularly acute in aircraft as the frequency of the vibration may vary over a wide range.

There have been numerous attempts to overcome this problem. One such attempt involves deforming the nut to a generally elliptical internal cross-sectional shape so that the nut will tightly grip the external threads of the stud to thereby frictionally retard relative rotation between the stud and nut. Because of the substantial amount of friction between the stud and nut, it is very difficult to screw and unscrew the stud from the nut. The high friction between the stud and nut causes substantial wear on the fastener and, upon repeated usage, the gripping capability of the nut is reduced thereby correspondingly increasing the danger that the fastener will become unfastened. Finally, this arrangement does not provide a positive lock, but merely provides a retarding or braking action against rotation of the stud relative to the nut. Other fasteners employing frictional retarding characteristics have also been developed; however, these are fraught with same or similar disadvantages.

Another attempt to provide a self-locking fastener, which is a variation of the frictional lock described above uses two ratchet plates having meshing teeth normally held in driving engagement by a spring. One of the ratchets rotates with the stud and the other is held against rotation but is movable axially. To fasten the stud to the nut, the stud and nut are rotated relative to each other. This causes the ratchets to rotate relative to each other thereby causing the teeth of one of the ratchets to slide over the teeth of the other ratchet. Relative rotation between the stud and nut is resisted by the spring and ratchets. A primary disadvantage of this fastener is that the life thereof is reduced as the wear between the continuously engaged ratchet teeth is substantial. Furthermore, the profile of the teeth permits relative rotation between the ratchets in both directions and therefore no positive lock is provided, but rather the ratchets provide only a braking or retarding action. However, to the extent that this retarding action is achieved, it makes fastening and unfastening of the stud and nut more difficult as the retarding action is ineffective to resist relative rotation between the stud and nut in both directions.

Summary of the invention

The fastener of this invention has a positive self-locking feature which does not depend on friction and which does not lose effectiveness upon repeated usage. The useful life of the locking portion of this fastener is substantially longer than the useful life of corresponding portions of prior art fasteners. This results from substantially reducing wear on the locking elements of the fastener. This fastener is easy to fasten and unfasten as the lock thereof exerts no retarding or locking action during this time. The shear strength of this fastener is improved as no threaded passageway is provided through the stud.

The present invention is particularly applicable to a fastener of the type including an externally threaded stud and an internally threaded nut adapted to receive the stud. The stud can be rotated relative to the nut to threadedly secure the nut thereto and counterrotated relative to the nut to free the nut from the stud.

A basic concept of this invention is to positively lock, as distinguished from retarding, the stud against counterrotation relative to the nut. A related basic concept is to completely disengage or release the positive lock to allow relative counterrotation between the stud and nut. With the lock disengaged, there is no wear thereon as the stud and nut are rotated relative to each other, nor can the lock retard such relative rotation.

These concepts can be advantageously embodied in a fastener which carries a movable actuator member in the stud. The actuator member is exposed so that it can be moved relative to the stud. The positive lock is responsive to movement of the actuator member to become disengaged from either the stud or the nut to allow relative rotation in both directions between the stud and nut.

The present invention teaches that it is desirable to expose an outer end of the actuator member at the head portion of the stud so that the actuator member is engageable and depressible by the tool which is utilized to rotate the stud. The locking means are made releasable or disengageable from the stud in response to the depressing of the actuator member. In this manner, the lock is automatically disengaged when the tool for rotating the stud is drivingly engaged with the stud.

Although various forms of locking means can be used, the locking means can advantageously be embodied in a pair of locking members the first of which is rotatable with the stud and the second of which is movable axially and held against rotation. When the locking members are held in locking engagement, a positive locking connection is formed between the stud and the second locking member. The actuating member is movable to disconnect or break this locking connection at the will of the operator to allow free rotational movement of the stud relative to the nut without interference from the locking members.

To facilitate indexing of the locking members, each of the locking members preferably includes a ratchet. To provide a positive lock each of the ratchets preferably has a plurality of teeth, the profile of which defines at least one generally axially extending face. The axially extending faces of the two ratchets are engageable so that no rotational forces applied to the second ratchet by the first ratchet through the axial faces will be operative to cam the second ratchet axially. In this manner, the stud is positively locked against conterrotation relative to the nut when the two ratchets are held in driving engagement with each other.

With a view toward simplifying construction and reducing the cost thereof both of the ratchets are preferably identical. The first ratchet can be easily mounted for rotation with the stud by providing a noncircular aperture therethrough which receives a correspondingly shaped end portion of the stud. Similarly, the second ratchet may be retained against rotation by the use of an axially extending shaft of noncircuar cross-section.

When the fastener is used in connection with an access panel, the last one-eighth of a turn of the stud is very important in that it accomplishes the desired preloading of the panel. For this reason, to assure proper indexing of the teeth on the two ratchets it is preferred to utilize a relatively large number of the teeth. However, for applications where accurate indexing between the stud and the locking member is not particularly important, the construction of the fastener may be further simplified by utilizing a nonrotatable axially movable socket to accomplish the locking function. The socket may be a unitary member having a noncircular recess for receiving a corresponding noncircular end portion of the stud.

The invention, both as to its organization and method of operation together with further features and advantages thereof may best be understood by reference to the following description taken in connection with the accompanying drawings.

Brief description of the drawings

FIG. 2 is a bottom plan view of the fastener taken along line 2—2 of FIG. 1.

FIG. 3 is a sectional view taken along line 3—3 of FIG. 6 and showing the lower or second locking member.

FIG. 4 is a side elevational view taken along line 4—4 of FIG. 3 and showing one of the ratchets.

FIG. 5 is a sectional view taken along line 5—5 of FIG. 6 and illustrating the first or upper ratchet and the lower or inner end of the stud.

FIG. 6 is a sectional view similar to FIG. 1 with the locking device being in the released position.

FIG. 7 is a fragmentary sectional view illustrating a modified form of fastener constructed in accordance with the teachings of this invention.

Description of the preferred embodiments

Figure 1:
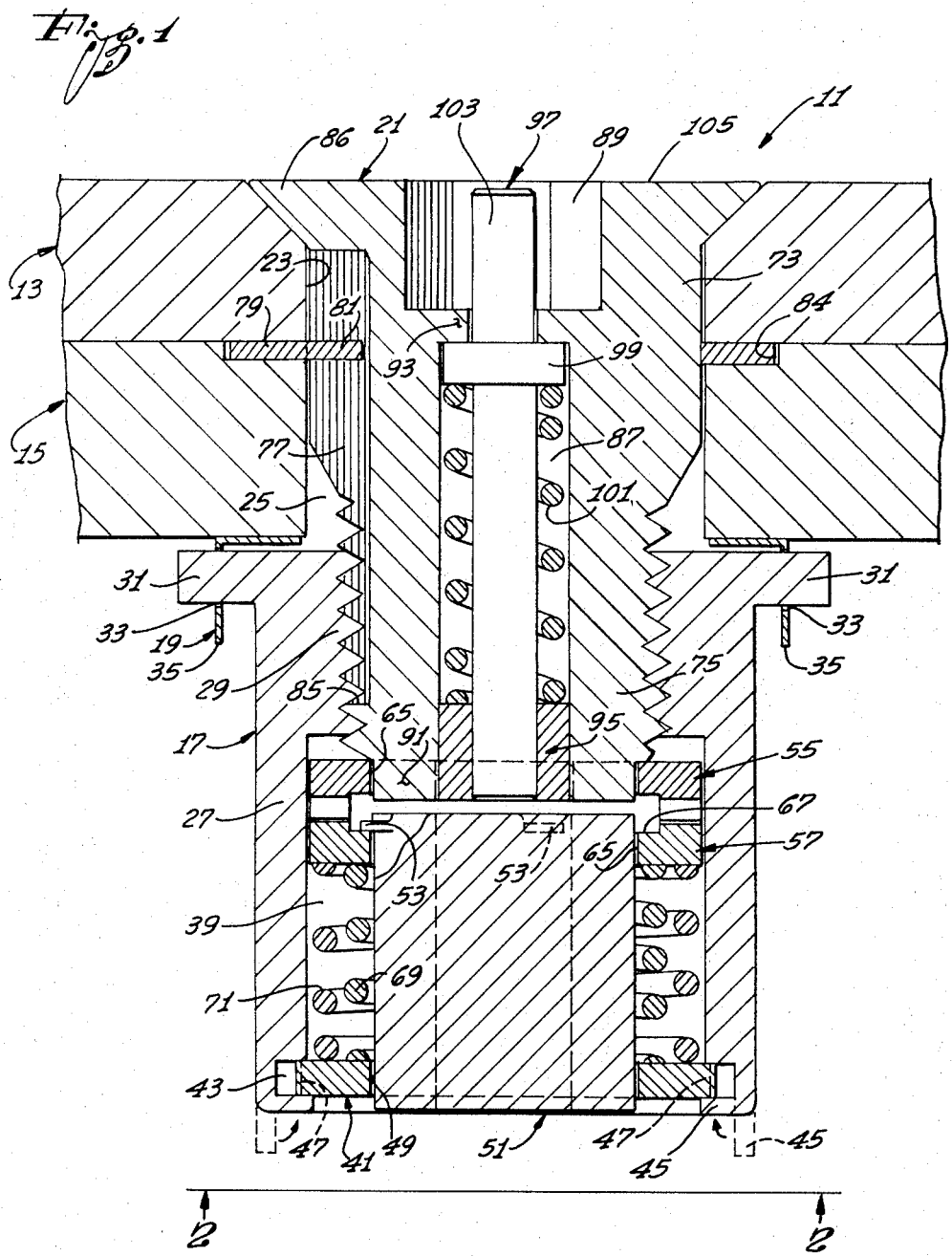
FIG. 1 is a longitudinal sectional view through a fastener constructed in accordance with the teachings of this invention with the locking means thereof being in the locked position.

Referring to the drawings and in particular to FIG. 1 thereof reference numeral 11 designates a fastener constructed in accordance with the teachings of this invention. The fastener 11 is shown in a typical environment in which it is utilized to connect an upper or outer panel 13 to an inner or lower panel 15. The upper panel 13 is removable from the panel 15. It is apparent, of course, that the adjectives upper and lower are used only with reference to the various figures of the drawing and the fastener 11 can assume any desired orientation.

Generally, the fastener 11 includes a receptacle assembly 17 suitably secured as by a cage 19 to the lower panel 15. The fastener 11 also includes a stud 21 which extends through aligned apertures 23 and 25 in the panels 13 and 15, respectively, and is threadedly affixed to the receptacle assembly 17 to hold the panels together. Other similar fasteners (not shown) may also be used to hold the panels 13 and 15 together. Although various materials may be used, the fastener 11 is preferably constructed of metal.

More specifically, the receptacle assembly 17 includes a receptacle 27 having an internally threaded axial nut portion 29 adjacent the upper end thereof. A pair of tabs 31 integral with the receptacle 27 project radially from the upper end thereof and are received in apertures 33 of the cage 19 (FIGS. 1 and 2). The apertures 33 are formed in downwardly extending flanges 35 of the cage 19. As best shown in FIG. 2, the cage 19 is secured to the lower side of the lower panel 15 by suitable fasteners 37.

The receptacle 27 defines an axial cylindrical cavity 39 (FIG. 1) immediately below the nut portion 29. The lower end of the cavity 39 is partially closed by an anti-rotation lock plate 41 which is retained in a peripheral groove 43. The groove 43 may be formed, for example, by bending of a lower end portion 45 of the receptacle 27 upwardly from the position shown in phantom in FIG. 1 to the position shown in full lines in FIG. 1. Preferably, the inner wall of the groove 43 has a plurality of radially extending serrations 47 (only two being shown in FIG. 1) to securely lock the plate 41 against rotation relative to the receptacle 27. As shown in FIGS. 1 and 2, the lock plate 41 has an axial noncircular aperture 49 extending therethrough. Although various configurations may be used, in the embodiment illustrated, the aperture 49 has a hexagonal configuration.

With reference to FIGS. 1-3, a shaft 51 is mounted within the aperture 49 and the cavity 39 for axial movement relative to the receptacle 27. The shaft 51 is nonrotatable relative to the receptacle 27 and this function may be simply accomplished by providing the shaft 51 with a noncircular cross sectional configuration which generally conforms to the noncircular configuration of the aperture 49. Thus, in the embodiment illustrated, the shaft 51 is of hexagonal configuration. Although the cross section of the shaft 51 and the configuration of the aperture 49 may assume many different forms, use of the hexagonal form is desirable in that hex stock for the shaft 51 is readily available at relatively low cost.

As shown in FIGS. 1 and 3, the shaft 51 has a plurality of generally radially extending ears 53 closely adjacent the upper end thereof. The ears 53 can be conveniently formed by deforming portions of the shaft 51 adjacent the upper end thereof to force the material thereof laterally outwardly. Although three of the ears 53 are shown in FIG. 3, any suitable number thereof can be provided.

A pair of locking members in the form of an upper ratchet 55 and a lower ratchet 57 are provided within the cavity 39. The ratchets 55 and 57 are identical and corresponding portions thereof are designated by corresponding reference numerals.

As shown in FIGS. 3 and 4, the ratchet 57 has a plurality of upwardly projecting teeth 59. Although any number of these teeth 59 may be provided, it is preferred to utilize a substantial number of teeth in order to facilitate indexing of the two ratchets 55 and 57, and in the embodiment illustrated, 24 equally spaced teeth 59 are provided on each of the ratchets. Each of the teeth 59 has a profile which includes an axially extending face 61 (FIG. 4) and an inclined face 63 which intersect at the tip of the tooth to form an angle which may be of the order of 60°. With the profile of the teeth 59 thus designed, it will be apparent that when the ratchets 55 and 57 are engaged as shown in FIG. 1, that the axially extending faces 61 will be in engagement to prevent relative counterrotation between the two ratchets.

The ratchet 57 has an axially extending aperture 65 extending therethrough and, as shown in FIG. 1, the upper end of the shaft 51 projects through the aperture 65. It is important that the lower ratchet 57 be mounted on the shaft 51 so that there can be no relative rotation therebetween. In the embodiment illustrated this is accomplished by forming the aperture 65 of a noncircular configuration which conforms generally to the cross sectional shape of the shaft 51. Accordingly, in the embodiment illustrated the aperture 65 is of hexagonal configuration. The ears 53 project laterally of the shaft 51 and engage an annular peripheral shoulder 67 on the ratchet 57 as shown in FIG. 1. The lower ratchet 57 is maintained in contact with the ears 53 by a pair of concentrically arranged coil springs 69 and 71 which extend between the upper surface of the lock plate 41 and the lower surface of the ratchet 57. Thus, the lower ratchet 57 and the shaft 51 form a nonrotatable axially movable unit.

The upper ratchet 55 is identical to the lower ratchet 57. As shown in FIG. 1, the teeth 59 of the ratchets 55 and 57 are enageable and both of the ratchets have outside diameters which are slightly smaller than the diameter of the cavity 39. The upper ratchet 55 is free to move within the cavity 39 except as controlled by the spring biased lower ratchet 57 and the stud 21.

The stud 21 has a head portion 73 and an externally threaded shank portion 75 which is receivable within the nut portion 29 to threadedly interconnect the stud and the receptacle assembly 17. If desired, the stud 21 may be secured to the upper panel 13 to prevent loss thereof when the stud 21 and the upper panel are removed from the lower panel 15. Although various means may be employed to accomplish this function, in the embodiment illustrated the stud 21 is formed with three axially extending grooves 77 (only one being shown in FIG. 1) and a platelike retaining ring 79 having three projections 81 (only one being shown in FIG. 1) is mounted on the stud 21 with the projections 81 being movable axially in the grooves 77. The grooves 77 terminate in an end surface 85 which prevents the retaining ring 79 from falling off the stud 21. The upper end of the head portion 73 of the stud 21 is formed with an annular peripheral enlargement 86. Accordingly, even with the stud 21 and the panel 13 removed from the panel 15, the stud 21 is secured to the panel 13 by the peripheral enlargement 86 and by the retaining ring 79.

The stud 21 has an axial passageway 87 extending therethrough. The upper end of the passageway 89 terminates in a radially enlarged noncircular recess or socket 89 having wrench flats. The lower or inner end of the passageway 87 terminates at an inner end portion 91 of the stud 21. An annular shoulder 93 projects radially into the passageway 89 immediately beneath the socket 89.

A tubular cylindrical spring retainer 95 is mounted in the lower end of the passageway 87 and an actuator member 97 is mounted in the passageway 87 for axial movement therein. The actuator member 97 is in the form of a cylindrical shaft which projects through the spring retainer 95 as shown and which has a peripheral enlargement 99 engageable with the shoulder 93 to limit the upward movement of the actuator member. A coil spring 101 acts between the upper end of the spring retainer 95 and the lower end of the peripheral enlargement 99 to bias the enlargement 99 into engagement with the shoulder 93. The actuator member 97 has an upper or outer end portion 103 which is normally exposed within the socket 89 and which preferably terminates very slightly beneath the plane of the upper end 105 of the stud 21.

When the two ratchets 55 and 57 are utilized, it is desirable to cause the upper ratchet 55 to be rotatable with the stud 21; however, it is preferred not to make the ratchet 55 an integral part of the stud 21. Accordingly, in the embodiment illustrated the inner end portion 91 of the stud 21 is provided with a noncircular cross sectional configuration which corresponds generally to the noncircular configuration of the aperture 65 in the upper ratchet 55 (FIG. 5). Thus, in the embodiment illustrated the inner end portion 91 is of hexagonal cross sectional configuration and adapted to be received within the hexagonal aperture 65 of the upper ratchet 55.

With the elements of the fastener 11 exposed as shown in FIG. 1, the stud 21 is locked against rotational movement which would tend to unscrew the stud from the nut portion 29. More particularly, the inner end portion 91 is received within the aperture 65 of the upper ratchet 55. Thus, the stud 21 cannot rotate relative to the upper ratchet 55. The teeth 59 of the ratchets 59 and 57 are in locking engagement in which the axial faces 61 thereof are in engagement. This relationship is maintained by the two coil springs 69 and 71. Thus, no relative counterrotational movement between the stud 21 and the nut portion 29 which would tend to unscrew the stud is possible. That is, the straight or axial faces 61 prevent any counterrotational forces applied by the ratchet 55 to the ratchet 57 through the faces 61 from having an axial component tending to cam the ratchet 57 axially. Accordingly, the ratchets 55 and 57 are maintained in locking relationship to prevent counterrotational movement of the stud 21 relative to the nut portion 29.

The lower ratchet 57 is held against rotation by the shaft 51 which in turn is held against rotation by the lock plate 41 which is fixed to the receptacle 27. Thus, the stud 21 is positively locked within the nut portion 29.

Assuming now that the user desires to unscrew the stud 21 from the nut portion 29, a tool 107 (FIG. 6) is inserted into the socket 89 and into engagement with the wrench flats thereof. The lower end of the tool 107 engages the upper end of the actuator member 97 to axially depress the latter to the position shown in FIG. 6. This causes the lower end of the actuator member 97 to engage the upper end of the shaft 51 and urge the latter and the lower ratchet 57 axially downwardly away from the nut portion 29 against the biasing force of the springs 69 and 71 to the position shown in FIG. 6. With the fastener 11 in the position shown in FIG. 6, the upper ratchet 55 will fall off of the inner end portion 91 of the stud 21 to thereby free the stud for rotation or counterrotation relative to the nut portion 29. Of course, if the fastener 11 were inverted from the position shown in FIG. 6, the ratchet 55 would remain on the inner end portion 91 of the stud 21 until the stud 21 were withdrawn from the cavity 39. In this event however the ratchets 55 and 57 would be axially separated so that the stud 21 would be free to rotate in either direction relative to the nut portion 29.

In the embodiment illustrated, the socket 89 is of hexagonal configuration so that the stud 21 is adapted to be rotated by a hex wrench. It should be understood however that one concept of the invention is to automatically free the stud 21 for rotation in response to engaging the stud with the appropriate tool for rotating the latter. Thus, the head portion 71 of the stud could be modified to receive other turning tools such as a screw driver. Also, the head portion 73 could project above the upper surface of the panel 13 and form, for example, a bolt head and, the outer end portion 103 could project above the upper end 105 of the head portion 73 for cooperation with other types of tools such as a socket wrench. However, this latter form is not preferred because with the outer end portion 103 projecting axially beyond the upper end 105, it is more likely to be inadvertently depressed.

When the ratchets 55 and 57 are engaged, the inclined faces 63 of the teeth 59 permit rotational movement of the stud 21 which would attach the stud to the nut portion 29. However, as the tool 107 is operative to automatically release the locking means for the studs 21, the lock formed by the ratchets 55 and 57, the shaft 51, and the plate 41 will be inoperative automatically during fastening of the fastener 11 with the tool 107. As the locking means is inoperative during fastening and unfastening of the fastener 11, the wear thereon, and particularly the wear on the teeth 59, is substantially reduced. Furthermore, the lock does not retard the screwing or unscrewing of the stud 21 and nut portion 29. It should also be noted that the locking feature of this invention is completely automatically in response to threadedly attaching the stud 21 to the nut portion 29. Although the actuator member for unlocking or disconnecting the locking means could be located in various positions, it is preferred to locate it in the stud to allow for easy access thereto and to provide for automatic operation thereof in response to the use of a tool for rotating the stud 21.

FIG. 7 illustrates another embodiment of the present invention. In FIG. 7 only a portion of the fastener 11a is illustrated, it being understood that other portions thereof are identical to the fastener 11 shown in FIGS. 1–6. Corresponding identical portions of the fastener 11a are designated in FIG. 7 by corresponding reference characters followed by the letter a.

The fastener 11a includes a unitary locking member 109 having axial upwardly opening recess or opening 111 into which the inner end portion 91a of the stud 21a is receivable. The recess 111 has a noncircular configuration corresponding to the noncircular configuration of the inner end portion 91a. Thus, in the embodiment illustrated, the recess 111 and the inner end portion 91a are of hexagonal configuration. The locking member 109 is preferably also of noncircular cross sectional configuration and may be hexagonal so that it can be held against rotation means such as the lock plate 41 shown in FIG. 1. Thus, the locking member 109 is, like the shaft 51, nonrotatable and axially movable within the cavity 39a. Springs 69a and 71a urge the unitary locking member 109 upwardly toward the nut portion 29a.

With the elements of the fastener 11a disposed as shown in FIG. 7, the inner end portion 91a is received within the recess 111 and held against rotation by the locking member 109. To rotate the stud 21a in either direction from that shown in FIG. 7, it is necessary to first depress the actuator member 97a to urge the locking member 109 axially away from the stud 21a until the inner end portion 91a is no longer received within the recess 111 at which time, the stud 21a may be rotated in either direction relative to the nut portion 29a.

The primary advantage of the embodiment of FIG. 7 is that the ratchets 55 and 57 have been eliminated as the unitary locking member 107 performs the positive locking function. On the other hand however, the use of the ratchets 55 and 57 which have a substantial number of the teeth 59, substantially facilitates and improves indexing to allow locking of the stud 21 in any one of numerous angular positions depending upon the number of teeth 59 provided. In this connection however more indexing positions can be provided in the embodiment of FIG. 7 by making the recess 111 and the inner end portion 91a of polygonal configuration having a substantial number of sides.

What is claimed is:

1. In a fastener for securing together a pair of panels wherein each of the panels has an aperture therethrough, the combination of:
a receptacle connectible to one of the panels and having an internally threaded nut portion;
a stud extendible through the apertures of the panels and having an externally threaded shank portion and a head portion, said stud being rotatable relative to said nut portion to turn the threaded shank portion into said nut portion to secure said stud to said nut portion, said stud becoming disconnected from said nut in response to relative counterrotation between said stud and said nut, said stud having a noncircular end portion;
a first locking member within said receptacle, said first locking member having a noncircular aperture therein sized to receive said noncircular end portion of said stud to drivingly connect said first locking member and said stud, said stud being separable from said first locking member;
a second locking member mounted within said receptacle for generally axial movement relative to said nut portion;
means for locking said second locking member against counterrotation, said second locking member being lockingly engageable with said first locking member to form a locking connection between said stud and said second locking member to allow said second locking member to positively lock said stud against said counterrotation;
biasing means in said receptacle for urging said second locking member into locking engagement with said first locking member; and
movable means for moving said second locking member generally axially relative to said first locking member against the force of the biasing means to break said locking connection to allow counterrotation of said stud relative to said nut portion to allow unscrewing of the shank portion from the nut portion.

2. A combination as defined in claim 1 wherein said first and second locking members include first and second ratchets, respectively, with each of said ratchets having teeth for meshing with the teeth of the other ratchet, each of said teeth having one axially extending face, the axially extending faces of said first ratchet being engageable with the axially extending faces of the second ratchet to prevent counterrotation of said stud relative to said nut portion when said ratchets are lockingly engaged.

3. A combination as defined in claim 1 wherein said means for locking said second locking member against counterrotation includes a plate fixed within said receptacle and having a noncircular aperture therethrough and a shaft movable axially in said receptacle with said second locking member and holding said second locking member against rotation, said shaft having a cross sectional configuration generally conforming to the configuration of said noncircular aperture, said shaft being receivable in said noncircular aperture to prevent rotation of said shaft and of said second locking member.

4. A combination as defined in claim 1 including an axial passageway extending through said stud and wherein said movable means includes an actuator member mounted for generally axial movement within said stud, said actuator member being movable axially inwardly to move said second locking member axially to break said locking connection to allow rotation and counterrotation of said stud relative to said nut portion without interference from said locking members.

5. In a fastener for securing together a pair of panels wherein each of the panels has an aperture therethrough, the combination of:
a receptacle connectible to one of the panels and having an internally threaded nut portion;
a stud extendible through the apertures of the panels and having an externally threaded shank portion and a head portion, said stud being rotatable relative to said nut portion to turn the threaded shank portion into said nut portion to secure said stud to said nut portion, said stud becoming disconnected from said nut in response to relative counterrotation between said stud and said nut;
a first locking member within said receptacle;
releasable interconnecting means for drivingly connecting said stud and said first locking member, said interconnecting means being releasable to allow separation of said first locking member and said stud;
a second locking member mounted within said receptacle, said second locking member being lockingly engageable with said first locking member to form a locking connection between said stud and said second member, said second locking member having a noncircular aperture therein;
a shaft in said receptacle having a noncircular end portion receivable in said noncircular aperture to thereby prevent relative rotation between said locking member and said shaft, said shaft having retaining ears formed integrally therewith and projecting laterally thereof adjacent the inner end of said shaft;

means for mounting said shaft for axial movement within said receptacle and for locking said shaft against rotation;

biasing means in said receptacle for urging said second locking member against said ears and for urging said locking members into locking engagement; and movable means for moving said shaft and said second locking member generally axially relative to said first locking member against the force of the biasing means to break said locking connection to allow counterrotation of said stud relative to said nut portion to allow unscrewing of the shank portion from the nut portion.

References Cited

UNITED STATES PATENTS

| | | | |
|---|---|---|---|
| 1,069,496 | 8/1913 | Symons | 151—11 |
| 2,335,828 | 11/1943 | Herget | 151—8 |
| 2,369,297 | 2/1945 | Johnson | 151—8 |
| 2,737,222 | 3/1956 | Becker | 151—69 |
| 2,976,901 | 3/1961 | Heyworth | 151—11 |

FOREIGN PATENTS

| | | |
|---|---|---|
| 155,583 | 3/1954 | Australia. |

MARION PARSONS, JR., *Primary Examiner.*